(No Model.)

W. SLOW.
Strainer for the Outlet of Tubs and Basins.
No. 241,739. Patented May 17, 1881.

WITNESSES:
Chas. Nida
C. Sedgwick

INVENTOR:
W. Slow
BY Munn & Co
ATTORNEYS.

UNITED STATES PATENT OFFICE.

WILLIAM SLOW, OF NEW YORK, N. Y.

STRAINER FOR THE OUTLETS OF TUBS AND BASINS.

SPECIFICATION forming part of Letters Patent No. 241,739, dated May 17, 1881.

Application filed March 9, 1881. (No model.)

*To all whom it may concern:*

Be it known that I, WILLIAM SLOW, of the city, county, and State of New York, have invented a new and Improved Strainer for the Outlets of Tubs and Basins, of which the following is a specification.

The object of my invention is to provide a new and improved strainer which can be removed from the washer of the outlet of a tank, tub, or basin, for the purpose of clearing it in case it has become clogged.

The invention consists in the combination, with a washer having an internally-threaded neck, of a strainer having an externally-threaded vertical flange, whereby a plug may be inserted within said flange or the strainer may be removed from the washer, as hereinafter described.

Figure 1:
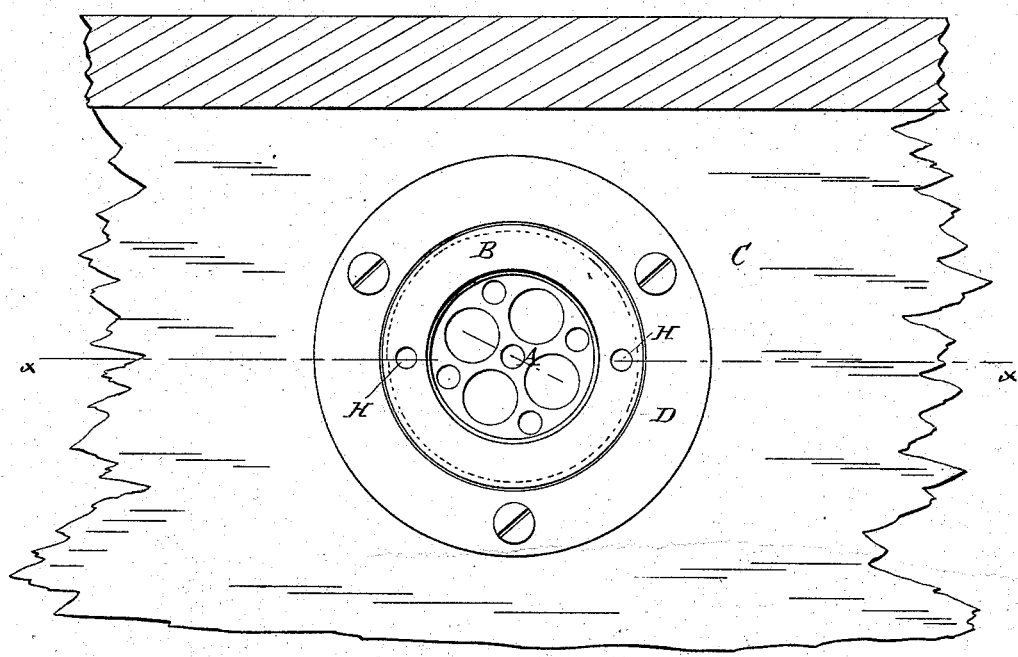
Figure 3:
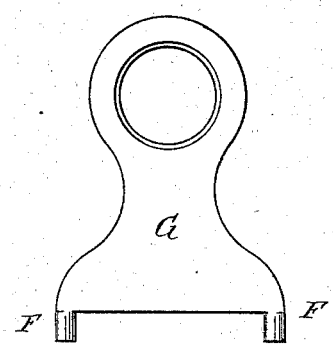
Figure 2:
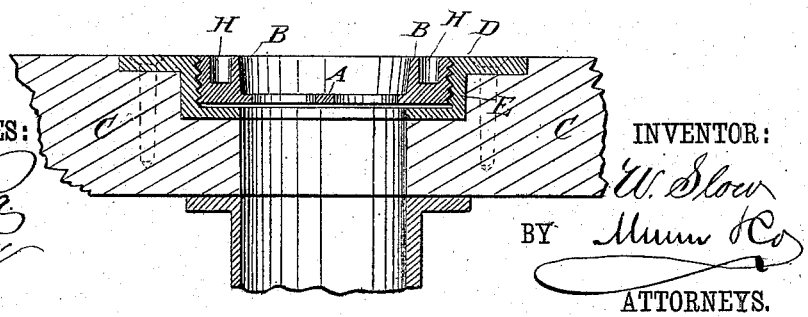

In the accompanying drawings, Figure 1 is a plan view of a washer of an outlet for tubs or basins provided with my improved removable strainer. Fig. 2 is a cross-sectional elevation of the same on the line $x\,x$, Fig. 1, and Fig. 3 is an elevation of the key for removing the strainer.

Similar letters of reference indicate corresponding parts.

The strainer A is provided with an externally-threaded flange, B, projecting upward, and thus forming a recess to receive the plug for closing the outlet of a wash-tub, C, sink, wash-basin, &c.

The washer D, which is fastened in the bottom of the tub or sink, is provided with an internally-threaded neck, E, in the threads of which the threads of the sleeve or flange B take. The upper end surface of the sleeve or flange B is provided with apertures H H for receiving the studs F of a key, G, for screwing the strainer into or out of the neck.

The strainer may consist of an apertured plate, as shown, or of netting, or two bars, as may be desired.

Threads, pieces of paper, cloth, &c., will be caught by the strainer and will clog the same in a certain time, and these obstructions could only be removed with great difficulty heretofore. If my improved strainer is used the same need only be unscrewed and can then be cleaned very conveniently. The waste-pipe can also be cleaned very conveniently if the strainer is removed. The strainer can also be held in the washer by means of studs passing into suitable grooves or by other suitable means.

Having thus described my invention, I claim as new and desire to secure by Letters Patent—

The combination, with a washer, D, having the internally-threaded neck E, of the strainer A, having an externally-threaded vertical flange, B, whereby a plug may be inserted within said flange, or the strainer may be removed from the washer, as shown and described.

WILLIAM SLOW.

Witnesses:
OSCAR F. GUNZ,
C. SEDGWICK.